United States Patent [19]

Modly

[11] Patent Number: 5,006,175
[45] Date of Patent: Apr. 9, 1991

[54] HIGH INFRA RED REFLECTING BROWN RUTILE PIGMENT COMPOSITIONS

[75] Inventor: Zoltan M. Modly, Shaker Hts., Ohio

[73] Assignee: Engelhard Corporation, Edison, N.J.

[21] Appl. No.: 485,464

[22] Filed: Feb. 27, 1990

[51] Int. Cl.$^5$ .............................................. C09C 1/36
[52] U.S. Cl. ..................................... 106/439; 106/436
[58] Field of Search ................................ 106/436, 439

[56] References Cited
U.S. PATENT DOCUMENTS
3,577,379  3/1969  Sandier et al. ......................... 260/40

Primary Examiner—Mark L. Bell
Assistant Examiner—Alan Wright
Attorney, Agent, or Firm—Renner, Otto, Boisselle & Sklar

[57] ABSTRACT

Desirable high infra red reflecting brown rutile pigment compositions are described which comprise from about 40 to about 50% by weight of titanium, from about 2.3 to about 4.5% by weight of manganese, from about 7.3 to about 11% by weight of tungsten, from 0.05 to about 5% of lithium and from about 0.1 to about 20% of cerium.

The invention also relates to the method of preparing the brown rutile pigment compositions and to the use of such pigments as colorants for polyvinyl halide compositions, and in particular, polyvinyl chloride compositions.

11 Claims, No Drawings

HIGH INFRA RED REFLECTING BROWN RUTILE PIGMENT COMPOSITIONS

TECHNICAL FIELD

This invention relates to brown rutile pigment compositions and more particularly to such compositions comprising a major amount of titanium. The pigments have a high reflectance in the infra red range.

BACKGROUND OF THE INVENTION

In recent years there has been a steady growth in the use of polymeric compositions as a substitute for wood and other materials of construction in building applications. In particular, there has been an increased use of rigid polyvinyl chloride in place of wood for house sidings. This polymeric material has many decorative and structural characteristics that are desired, and it can be blended with a wide variety of inorganic pigments to give an infinite number of colors and hues.

One of the problems with polyvinyl chloride compositions is their tendency to oxidize and degrade. Oxidized polyvinyl chloride becomes brittle and cracks in a very short time. Accordingly, one desirable characteristic of the pigments and other additives that are blended with the vinyl chloride is their ability to reflect infra red rays. A highly infra red reflective siding will remain cooler when exposed to sunlight than a siding containing additives which readily absorb many of these infra red rays. Lower temperatures mean a lower heat build-up within the structure and longer life for the siding. A reduction of a few degrees in the heat build-up translates into a substantial increase in the life of the siding.

The standard procedure for preparing metal oxide pigments consists of calcining an intimate mixture of oxides or oxide precursors of primarily transition metals. Color properties develop from the formation of solid solutions containing the transition metals having colored ions. Colors produced by calcining essentially white pigments with small additions of foreign elements to produce stable tinted pigments have been commercially developed over the last 30 years. For example, titanium dioxide becomes colored when calcined with minor amounts of transition metals.

Metal oxide pigments are widely used as colorants in the paint, plastics and ceramics industries and they are principally known for their chemical, thermal and weathering stabilities. While the same basic pigment compositions can be used by these industries to color the various medias ranging from complex organic polymers to glass, it is often necessary to adjust the physical properties of each pigment to meet the specifications for its successful commercial application. For example, a ceramic color is composed usually of coarser particles to minimize dissolution in the strong alkaline glazes and thereby maintain color intensity. Conversely, the paint and plastics industries prefer pigments in a relatively finely divided state to permit easy dispersion and optimize properties of gloss, brightness, strength and opacity. For tinted paints, the necessity of introducing a separate colored pigment can in certain cases introduce weak features as far as their stability to light, heat, solvents and chemicals are concerned resulting in flotation, flocculation, recrystallization, sublimation and chalking. The use of "tinted white" or "titanate pigments" offers a way to overcome the difficulties associated with unstable tinted systems without departing from the whitening, hiding and other valuable pigmentary properties inherent in the "host" element which in this instance is titanium dioxide.

A large number of pigments in which the major component is a white pigment such as titanium dioxide which accepts minor additions of intensely colored metal ions to produce pastel colorants are described in U.S. Pat. No 3,022,186. This patent describes solid solutions resulting from a large number of combinations of metal oxides or fluorides as guest components in a number of host lattices, but principally rutile titanium dioxide. The pigments prepared or disclosed in U.S. Pat. No. 3,002,186, while possessing the desired color values, are generally deficient in some physical characteristics such as texture, i.e., ease of dispersibility, gloss and opacity necessary for commercial use in the paint and plastics industries. Of the various combinations of metals described in the '186 patent, manganese (III) and tungsten (VI) are described as metals which can be incorporated into the solid solutions. Example 5 describes a pigment prepared from anatase, manganese oxide and tungsten oxide. The resulting pigment is reported to be a dark red-brown pigment. In Example 13, the same components are mixed in different amounts and a pale pink to reddish brown pigment is reported to be formed.

Reissue Pat. No. Re 21,427 describes the process for forming titanium dioxide pigments by combining the titanium dioxide with a compound of a heavy metal. Examples of heavy metals listed in Col. 1, lines 21-25 include vanadium, chromium, iron, cobalt, nickel, manganese and copper.

U.S. Pat. No. 3,956,007 describes antimony-free yellow pigments prepared by calcining anatase with a specified amount of nickel, tungsten, zinc, lithium, cerium and magnesium compounds.

SUMMARY OF THE INVENTION

Desirable high infra red reflective brown rutile pigment compositions are described which comprise from about 40 to about 50% by weight of titanium, from about 2.3 to about 4.5% by weight of manganese, from about 7.3 to about 11% by weight of tungsten, from 0.05 to about 5% of lithium and from about 0.1 to about 20% of cerium.

The invention also relates to the method of preparing the brown rutile pigment compositions and to the use of such pigments as colorants for polyvinyl halide compositions, and in particular, polyvinyl chloride compositions.

DESCRIPTION OF THE INVENTION

The pigments of the present invention are primarily based upon titanium, manganese and tungsten which provide the pigment with the desired high IR reflecting brown color. The brown pigments of the invention also contain smaller amounts of other metals such as cerium and lithium which provide the pigment with additional desirable properties such as smaller particle size and stronger tint.

The host element of the pigment compositions of the present invention is titanium dioxide which is mixed in the anatase grade or crystal structure, but which is converted to a rutile crystal structure upon calcination to a solid solution. The titanium dioxide must have particles no greater in size than about 1.5 microns, preferably no greater than about 1 micron, and, as a practical matter, at least 0.25 micron to achieve satisfactory mixing and calcining and to produce an optimum pigment for a given formulation. Such fine particle titania is commercially available, and the commercially available titania is generally of sufficient impurity to be used as purchased.

The two critical guest elements are manganese and tungsten which are present in the solid solution as their oxides. The manganese present in the solid solution is essentially completely in the +3 oxidation state. The manganese may be introduced as manganese oxide but is generally added to the mixture as the hydroxide, carbonate, acetate, nitrate or formate. Manganese carbonate is an effective form for introducing the manganese into the pigments of the invention.

The tungsten is present in the solid solution as tungstic oxide and is usually admixed as tungstic acid or ammonium meta-tungstate. The tungstic acid which is commercially available is used generally in the form of particles having a maximum size of about 5 microns and a minimum size of at least about 1 micron.

The third guest element is lithium which is present in the solid solution as lithium oxide. Lithium generally is admixed as lithium carbonate in the form of particles having a minimum size of about 1 micron and a maximum size of about 10 microns.

The final required guest element is cerium which appears in the solid solution as cerium oxide. The cerium is usually admixed as ceric hydrate. Commercially available ceric hydrate is of sufficient purity to be used as purchased. The cerium hydrate used in the formation of the pigments of the present invention is a powder comprising particles having a minimum size of about 0.5 micron and a maximum size of about 2 microns.

The pigments of the invention are generally prepared by adding the lithium and cerium materials to the anatase titanium dioxide, tungstic acid and manganese carbonate mixture prior to calcination to minimize aggregation, to reduce the energy for pulverization and to improve the dispersibility of the pigment. The pigment compositions of the present invention are prepared by mixing and calcining a mixture comprising from about 68 to about 83% by weight of titanium dioxide, about 2.3 to about 4.5% by weight of manganese, from about 7.3 to about 11% by weight of tungsten, from about 0.05 to about 5% by weight of lithium, and from about 0.6 to about 20% by weight of cerium.

The calcination temperature generally is from about 800° C. to about 1200° C., and the calcination time can be varied from about 1 to about 6 hours.

It has been observed that the incorporation of lithium as lithium carbonate in the mixture prior to calcination permits calcination to less than 0.5% of the titanium dioxide as anatase at lower temperatures than when the lithium carbonate is omitted while still retaining comparatively good texture. The omission of the lithium carbonate from the mixture requires calcination of the product at a temperature of at least 25° to about 50° C. higher which has a detrimental effect on the quality.

When cerium is incorporated into the pigments of the present invention such as by the addition of ceric hydrate to the mixture prior to calcination, the tendency of the pigment to aggregate is minimized thereby enhancing tinting strength and dispersibility. In one preferred embodiment, the manganese to tungsten weight ratio in the pigment composition is from about 0.6:1 to about 0.2:1, and the manganese is trivalent manganese. In another embodiment, the pigment composition contains from about 47 to about 50% by weight of titanium which is present as titanium dioxide, at least 95% of which has the rutile crystal structure. In other preferred embodiments, the amount of lithium present in the pigment is from about 0.05 to about 0.1, and the amount of cerium present is from about 0.6 to about 1.4.

In a yet further embodiment, the high temperature of brown rutile infra red reflecting rutile pigment compositions of the present invention comprise from about 48% by weight of titanium as titanium dioxide, at least 99% of which has the rutile crystal structure, and said titanium dioxide contains within its structure, about 3.4% by weight of trivalent manganese, about 9.1% by weight of tungsten, from about 0.05 to about 0.1% by weight of lithium, and from about 0.6 to about 1.4% by weight of cerium. The weight ratio of manganese to tungsten in the above embodiment is about 0.3:1.

The following Examples 1-3 illustrate the brown rutile pigment compositions of the present invention and the method for preparing the pigments. Example A is a control example containing no lithium or cerium. Unless otherwise indicated in the following examples and elsewhere in the specification and claims, all parts and percentages are by weight and degrees are expressed as degrees Celsius.

In the following examples, the components are dry mixed and pulverized in a laboratory hammermill and calcined at the indicated temperatures for three hours in a Harrop gas kiln.

TABLE I

| | Brown Rutile Pigments | | | | | | | |
|---|---|---|---|---|---|---|---|---|
| | Example | | | | | | | |
| | A | | 1 | | 2 | | 3 | |
| Component | Parts | % | Parts | % | Parts | % | Parts | % |
| Titanium dioxide | 26.67 | 80.0 | 26.33 | 79.0 | 25.67 | 77.0 | 26.00 | 78.0 |
| Manganese carbonate | 2.50 | 7.5 | 2.47 | 7.41 | 3.06 | 9.19 | 2.64 | 7.91 |
| Ammonium Meta Tungstate | 4.16 | 12.5 | 4.15 | 12.45 | 4.20 | 12.6 | 4.31 | 12.95 |
| Carium hydrate | — | — | 0.33 | 0.99 | 0.35 | 1.06 | 0.33 | 0.99 |
| Lithium carbonate | — | — | 0.05 | 0.15 | 0.05 | 0.15 | 0.05 | 0.15 |
| Total | 33.33 | 100 | 33.33 | 100 | 33.33 | 100 | 33.33 | 100 |
| Calcination Temp (°C.) | 975 | 950 | 950 | 950 | | | | |

The brown rutile compositions of the present invention exhibit increased tinting strength, and when used in a rigid vinyl polymer results in a decorative building material that remains cooler because the pigment is infra red reflective between 700-1000 NM. The pigments of the invention are also useful in tinting alkyd resins and produce an iron-free "reddish" shade of light brown.

The pigments of the present invention may be blended with polyvinyl chloride resins such as vinyl materials marketed by the The B. F. Goodrich Chemical Company under the general trade designation "Geon". One example of such a clear vinyl polymer is Geon A5862 Natural. 001 resin. The blend of pigment and polyvinyl chloride resin (containing up to about 50% by weight of pigment) may be extruded into architectural shapes such as rigid siding having a reddish brown color.

One of the advantages of the brown rutile pigments of the present invention is that they can be prepared at lower temperatures then corresponding pigments which do not contain the cerium and lithium ions. As illustrated in Example A and Example 1, the pigment of the present invention (1) is obtained by calcining the precursor mixture at a temperature of 950° C. whereas the Control Example A is calcined at 975° C. Even though calcined at different temperatures, both pigments attain almost similar masstone intensity. The lower calcination temperature for Example 1 also resulted in the formation of smaller particle sizes and consequently a stronger tint. The difference in the particle growth in the two examples is demonstrated by pulverizing the pigments of Example A and Example 1 through a 0.013 herringbone screen using a laboratory hammermill to insure that both pigments ar treated equally after calcination. Wet screen analysis through a 325 mesh screen indicates that the pigment of Example A has a residue of 0.5% whereas the pigment of Example 1 (the invention) has a residue of only 0.1%.

Color values in masstone and tint were tested using a conventional laboratory "paint shaker"method, dispersing the pigments in an air-dry enamel vehicle, and grinding for 20 minutes on a paint shaker in a glass jar with glass beads. The tint was calculated as 50% pigment and 50% titanium dioxide. The dispersion was then drawn down on a "Leneta"opacity chart. Color differences were evaluated using the Diano Match-Scan Spectrophotomer and expressed in Hunter values. Tint strength differences were calculated using the K/S figure at 460 nanometer. The differences between the pigment of Example 1 and the pigment of Example A were found to be as follows:

TABLE II

|           | DE   | LD    | RG    | YB    |
|-----------|------|-------|-------|-------|
| Masstone: | 0.18 | −0.13 | −0.09 | −0.09 |
| Tint (1:1)| 0.27 | −0.26 | 0.01  | −0.07 |

The results with respect to masstone show insignificant differences between the two pigments. In tint, however, is found that the pigment of Example 1 has a 3% strength advantage over the pigment of Example A, and this is believed to be due to the finer particle size.

Particle size differences are also quite visible on the drawdown charts. The pigment of Example A has a very rough surface, almost like sandpaper, as a result of the large particles, but the pigment of Example 1 has a smooth surface. The ability to obtain a fine particle size pigment after a single pulverization step is advantageous with respect to pigment quality and economy in manufacturing.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A brown rutile pigment composition comprising about 40 to about 50% by weight of titanium present as titanium dioxide, from about 2.3 to about 4.5% by weight of manganese, from about 7.3 to about 11% by weight of tungsten, from 0.05 to about 5% of lithium and from about 0.1 to about 20% of cerium.

2. The pigment composition of claim 1 wherein the manganese to tungsten weight ratio is from about 0.6:1 to about 0.2:1.

3. The pigment composition of claim 1 wherein the manganese in the pigment is trivalent manganese.

4. The pigment composition of claim 1 containing from about 47 to about 50% by weight of titanium.

5. The pigment composition of claim 1 wherein at least 95% of the titanium dioxide has the rutile crystal structure.

6. A brown rutile inorganic pigment composition comprising a solid solution of from about 68 to, 83% by weight of titanium dioxide, at least 99% of which has the rutile crystal structure, and said titanium dioxide contains within its structure, from about 2.3 to about 4.5% by weight of manganese, from about 7.3 to about 11% by weight of tungsten, from about 0.05 to about 0.1% by weight of lithium and from about 0.6 to about 1.4% by weight of cerium, and wherein the manganese is present as trivalent manganese.

7. The pigment composition of claim 6 wherein the manganese to tungsten ratio is from about 0.6:1 to about 0.2:1.

8. The pigment composition of claim 6 wherein the remaining titanium dioxide has the anatase crystal structure.

9. The pigment composition of claim 6 wherein the ratio of manganese to tungsten is about 0.3:1.

10. A brown rutile infra red reflecting rutile pigment composition comprising about 48% by weight of titanium as titanium dioxide, at least 99% of which has the rutile crystal structure, and said titanium dioxide containing within its structure, about 3.4% by weight of trivalent manganese, about 9.1% by weight of tungsten, from about 0.05 to about 0.1% by weight of lithium and from about 0.6 to about 1.4% by weight of cerium.

11. The pigment composition of claim 10 wherein the weight ratio of manganese to tungsten is about 0.3:1.

* * * * *